United States Patent
Mohan et al.

(10) Patent No.: US 12,124,456 B2
(45) Date of Patent: *Oct. 22, 2024

(54) METHOD AND APPARATUS FOR AUTOMATICALLY MAPPING PHYSICAL DATA MODELS/OBJECTS TO LOGICAL DATA MODELS AND BUSINESS TERMS

(71) Applicant: JPMorgan Chase Bank, N.A., New York, NY (US)

(72) Inventors: Ashwin Mohan, Bengaluru (IN); Muthu Chithambara Jothi, Bengaluru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,343

(22) Filed: May 26, 2023

(65) Prior Publication Data
US 2023/0297578 A1    Sep. 21, 2023

Related U.S. Application Data

(63) Continuation of application No. 17/444,225, filed on Aug. 2, 2021, now Pat. No. 11,698,906.
(Continued)

(51) Int. Cl.
*G06F 16/2455* (2019.01)
*G06F 16/22* (2019.01)
(Continued)

(52) U.S. Cl.
CPC ...... *G06F 16/24564* (2019.01); *G06F 16/221* (2019.01); *G06F 16/24522* (2019.01);
(Continued)

(58) Field of Classification Search
CPC ............ G06F 16/24564; G06F 16/221; G06F 16/24522; G06F 16/2462; G06F 16/258; G06N 20/00

See application file for complete search history.

(56) References Cited

U.S. PATENT DOCUMENTS 11,061,874 B1 * 7/2021 Funk ................... G06F 16/2468
11,886,399 B2 * 1/2024 Joyce .................. G06F 16/2228
(Continued)

*Primary Examiner* — Dangelino N Gortayo
(74) *Attorney, Agent, or Firm* — GREENBLUM & BERNSTEIN, P.L.C.

(57) ABSTRACT

Various methods, apparatuses/systems, and media for automatically mapping physical data models or objects to logical data models which in turn are automatically mapped to business terms are disclosed. A database stores a raw physical data model of an application. A processor extracts the raw physical data model of the application from the database. The processor also converts physical object names associated with the raw physical data model into English terms based on a taxonomy expansion list; applies a plurality of standardization and contextualization rules to the English terms generated from converting the physical object names; outputs names based on applying the plurality of standardization and contextualization rules to the English terms; applies fuzzy logic and machine learning routines and matching algorithms for matching the names to predefined logical terms; and automatically generates a mapping of physical objects or elements in the application with logical attributes and related business terms.

20 Claims, 7 Drawing Sheets

Related U.S. Application Data

(60) Provisional application No. 63/070,495, filed on Aug. 26, 2020.

(51) Int. Cl.
*G06F 16/2452* (2019.01)
*G06F 16/2458* (2019.01)
*G06F 16/25* (2019.01)
*G06N 20/00* (2019.01)

(52) U.S. Cl.
CPC ........ *G06F 16/2462* (2019.01); *G06F 16/258* (2019.01); *G06N 20/00* (2019.01)

(56) References Cited

U.S. PATENT DOCUMENTS

| | | | |
|---|---|---|---|
| 2019/0164063 A1 | 5/2019 | Moura et al. | |
| 2019/0347077 A1 | 11/2019 | Huebra | |
| 2020/0104362 A1* | 4/2020 | Yang | G06N 5/048 |
| 2020/0117658 A1* | 4/2020 | Venkata | G06F 16/248 |
| 2020/0143257 A1 | 5/2020 | Neelamana | |
| 2020/0226214 A1* | 7/2020 | Reddekopp | G06F 16/1734 |
| 2021/0165662 A1* | 6/2021 | Qiao | G06F 9/45558 |
| 2021/0173822 A1* | 6/2021 | Paulraj | G06Q 40/02 |
| 2021/0209159 A1 | 7/2021 | Mahanta et al. | |
| 2021/0342380 A1 | 11/2021 | Luus et al. | |
| 2021/0349430 A1* | 11/2021 | Munteanu | G06F 8/34 |

* cited by examiner

METHOD AND APPARATUS FOR AUTOMATICALLY MAPPING PHYSICAL DATA MODELS/OBJECTS TO LOGICAL DATA MODELS AND BUSINESS TERMS

CROSS-REFERENCE TO RELATED APPLICATIONS

This application is a Continuation of U.S. patent application Ser. No. 17/444,225, filed Aug. 2, 2021, which claims the benefit of priority from U.S. Provisional Patent Application No. 63/070,495, filed Aug. 26, 2020. The disclosure of each of these documents, including the specification, drawings, and claims, is incorporated herein by reference in its entirety.

TECHNICAL FIELD

This disclosure generally relates to data processing, and, more particularly, to methods and apparatuses for automatically mapping physical data models or objects to logical data models which in turn are automatically mapped to business terms.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

In general, large enterprises, corporations, agencies, institutions, and other organizations are facing a continuing problem of handling, processing, and/or accurately describing a vast amount of data that exists in corresponding applications in a quick and expedited manner. In addition, mergers and acquisitions often result in merging a vast number of applications and databases and storing data relating to those applications and databases electronically. The stored data that need to be analyzed by a variety of persons within the organization to determine where particular data may be located and who may be using them may prove to be extremely time consuming, confusing, and inefficient as the data being tracked increases and as organizations implement more specialized or distributed functions due to mergers and acquisitions.

For example, a large organization, across multiple line of businesses (LOBs), may have issues in accurately describing the data that exists in each of their applications corresponding to each LOB. One option to address this problem may be to map each of the physical objects that exists in an application to corresponding logical data model attributes which in turn are mapped to business terms. This way, by doing the mapping exercise, the lineage may be obtained which can then be used to accurately describe what data the application has as part of its data at rest boundary set.

However, this conventional mapping activity is currently extremely manual and requires SMEs (Subject Matter Experts). Information Architects. Information Owners and members from the CDO to sit together and go through physical object by physical object to map them either to logical data model attributes or to business terms. This conventional manual mapping activity may prove to be highly time consuming and error prone.

SUMMARY

The present disclosure, through one or more of its various aspects, embodiments, and/or specific features or sub-components, may provide, among others, various systems, servers, devices, methods, media, programs, and platforms for implementing an automatic mapping module for automatically mapping physical data models or objects to logical data models which in turn are automatically mapped to business terms, thereby significantly reducing data mapping time and eliminating errors in data mapping and automatically detecting and resolving data quality and data lineage issues corresponding to an application in an efficient manner, but the disclosure is not limited thereto. The present disclosure, through one or more of its various aspects, embodiments, and/or specific features or sub-components, may also provide, among others, various systems, servers, devices, methods, media, programs, and platforms for implementing an automatic mapping module that may be configured to automatically provide a "best match" based on the physical object name to equivalent logical attribute or business term, but the disclosure is not limited thereto.

The present disclosure, through one or more of its various aspects, embodiments, and/or specific features or sub-components, may also provide, among others, various systems, servers, devices, methods, media, programs, and platforms for implementing an automatic mapping module that may be configured to provide multiple suggestions (than a singular value) based on user feedback underpinned by a proprietary ranking algorithm which enables quicker identification of relevant matches, thereby accelerating the overall mapping activity. The confirmed mappings are then made available back to the applications to enrich their metadata and also to tools that enables data discoverability.

The present disclosure, through one or more of its various aspects, embodiments, and/or specific features or sub-components, may also provide, among others, various systems, servers, devices, methods, media, programs, and platforms for implementing an automatic mapping module that may be configured to implement a crawling feature that, upon user confirmation on the mapping suggestions, crawls through a database searching for attribute. If the attribute exits elsewhere in the application, the process will automatically prompt the user to confirm the mappings for each instance of the attribute, thereby accelerating the mapping process and making sure that the mappings are consistent.

According to an aspect of the present disclosure, a method for implementing an automatic mapping module by utilizing one or more processors and one or more memories is disclosed. The method may include: accessing a database that includes a raw physical data model of an application; extracting the raw physical data model of the application from the database; converting physical object names associated with the raw physical data model into English terms based on a taxonomy expansion list; applying a plurality of standardization and contextualization rules to the English terms generated from converting the physical object names; outputting names based on applying the plurality of standardization and contextualization rules to the English terms; applying fuzzy logic and machine learning routines and matching algorithms for matching the names to predefined logical terms; and automatically generating a mapping of physical objects or elements in the application with logical attributes and related business terms.

According to another aspect of the present disclosure, wherein the standardization process may include: implementing a pre-processing rule engine configured to move a sub-string of each English term from a beginning to an end; implementing a word translation rule engine configured to replace a flag with an indicator or to replace a person text to an individual; implementing a physical object/table contextualization engine configured to combine a generic name for a column or an attribute to a table name; and implementing a post-processing rule engine configured to remove any duplicates in a column or an attribute name.

According to yet another aspect of the present disclosure, wherein the taxonomy expansion list may be aggregated across a plurality of line of businesses (LOBs).

According to a further aspect of the present disclosure, wherein the applying artificial intelligence and/or machine learning routines and matching algorithms may include: implementing a fuzzy matching rule engine configured to utilize text length or tokenization algorithms to identify a best match against the predefined logical terms; and assigning a probability of accuracy value to each matched term. Thus, according to this exemplary embodiment, the tool disclosed herein is configured to provide ability to find a best match with the ability for a user to seek for top recommendations based on the learning algorithm that would allow the user to pick from. Failing which the user can search of a logical attribute/business term (new) which will then be incorporated into the learning process as well.

According to yet another aspect of the present disclosure, the method may further include: implementing an automated voting process engine configured to select an algorithm with a maximum hit value as the best match.

According to an additional aspect of the present disclosure, wherein the automated voting process engine implements a weight-based voting process.

According to yet another aspect of the present disclosure, the method may further include: receiving a user's input to confirm or reject the mapping of physical objects or elements in the application; and automatically updating the mapping of physical objects or elements in the application based on the received user's input.

According to a further aspect of the present disclosure, the method may further include: providing a plurality of mapping suggestions based on user feedback underpinned by a predefined ranking algorithm; receiving user confirmation on confirmed mappings based on the plurality of mapping suggestions; and utilizing the confirmed mappings to enrich metadata of the application.

According to an additional aspect of the present disclosure, the method may further include: implementing a crawling feature that, upon receiving user confirmation on the plurality of mapping suggestions, crawls through the database searching for attribute.

According to another aspect of the present disclosure, wherein, when the attribute exits elsewhere in the application, the method may further include: automatically prompting the user to confirm the mappings for each instance of the attribute.

According to another aspect of the present disclosure, a system for implementing an automatic mapping module is disclosed. The system may include a database that includes a raw physical data model of an application; and a processor coupled to the database via a communication network. The processor may be configured to: extract the raw physical data model of the application from the database; convert physical object names associated with the raw physical data model into English terms based on a taxonomy expansion list; apply a plurality of standardization and contextualization rules to the English terms generated from converting the physical object names; output names based on applying the plurality of standardization and contextualization rules to the English terms; apply fuzzy logic and machine learning routines and matching algorithms for matching the names to predefined logical terms; and automatically generating a mapping of physical objects or elements in the application with logical attributes and related business terms.

According to a further aspect of the present disclosure, the processor may be further configured to provide multiple suggestions (than a singular value) based on user feedback underpinned by a predefined ranking algorithm which enables quicker identification of relevant matches, thereby accelerating the overall mapping activity. The confirmed mappings are then made available back to the applications to enrich their metadata and also to tools that enables data discoverability.

According to yet another aspect of the present disclosure, the processor may be further configured to execute a crawling feature that, upon user confirmation on the mapping suggestions, crawls through a database searching for attribute. If the attribute exits elsewhere in the application, the processor will automatically prompt the user to confirm the mappings for each instance of the attribute, thereby accelerating the mapping process and making sure that the mappings are consistent.

According to an additional aspect of the present disclosure, wherein in the standardization process, the processor may be further configured to implement a pre-processing rule engine configured to move a sub-string of each English term from a beginning to an end; implement a word translation rule engine configured to replace a flag with an indicator or to replace a person text to an individual; implement a physical object/table contextualization engine configured to combine a generic name for a column or an attribute to a table name; and implement a post-processing rule engine configured to remove any duplicates in a column or an attribute name.

According to yet another aspect of the present disclosure, the processor may be further configured to aggregate the taxonomy expansion list across a plurality of line of businesses (LOBs).

According to a further aspect of the present disclosure, wherein in applying artificial intelligence and/or machine learning routines and matching algorithms, the processor may be further configured to implement a fuzzy matching rule engine configured to utilize text length or tokenization algorithms to identify a best match against the predefined logical terms; and assign a probability of accuracy value to each matched term.

According to another aspect of the present disclosure, the processor may be further configured to implement an automated voting process engine configured to select an algorithm with a maximum hit value as the best match.

According to yet another aspect of the present disclosure, the processor may be further configured to cause the automated voting process engine to implement a weight-based voting process.

According to a further aspect of the present disclosure, the processor may be further configured to receive a user's input to confirm or reject the mapping of physical objects or elements in the application; and automatically update the mapping of physical objects or elements in the application based on the received user's input.

According to another aspect of the present disclosure, a non-transitory computer readable medium configured to store instructions for implementing an automatic mapping module is disclosed. The instructions, when executed, may cause a processor to perform the following: accessing a database that includes a raw physical data model of an application; extracting the raw physical data model of the application from the database; converting physical object names associated with the raw physical data model into English terms based on a taxonomy expansion list; applying a plurality of standardization and contextualization rules to the English terms generated from converting the physical object names; outputting names based on applying the plurality of standardization and contextualization rules to the English terms; applying fuzzy logic and machine learning routines and matching algorithms for matching the names to predefined logical terms; and automatically generating a mapping of physical objects or elements in the application with logical attributes and related business terms.

According to a further aspect of the present disclosure, the instructions, when executed, may cause the processor to provide multiple suggestions (than a singular value) based on user feedback underpinned by a predefined ranking algorithm which enables quicker identification of relevant matches, thereby accelerating the overall mapping activity. The confirmed mappings are then made available back to the applications to enrich their metadata and also to tools that enables data discoverability.

According to yet another aspect of the present disclosure, the instructions, when executed, may cause the processor to execute a crawling feature that, upon user confirmation on the mapping suggestions, crawls through a database searching for attribute. If the attribute exits elsewhere in the application, the processor will automatically prompt the user to confirm the mappings for each instance of the attribute, thereby accelerating the mapping process and making sure that the mappings are consistent.

According to an additional aspect of the present disclosure, wherein in the standardization process, the instructions, when executed, may cause the processor to implement a pre-processing rule engine configured to move a sub-string of each English term from a beginning to an end; implement a word translation rule engine configured to replace a flag with an indicator or to replace a person text to an individual; implement a physical object/table contextualization engine configured to combine a generic name for a column or an attribute to a table name; and implement a post-processing rule engine configured to remove any duplicates in a column or an attribute name.

According to yet another aspect of the present disclosure, the instructions, when executed, may cause the processor to aggregate the taxonomy expansion list across a plurality of line of businesses (LOBs).

According to a further aspect of the present disclosure, wherein in applying artificial intelligence and/or machine learning routines and matching algorithms, the instructions, when executed, may cause the processor to implement a fuzzy matching rule engine configured to utilize text length or tokenization algorithms to identify a best match against the predefined logical terms; and assign a probability of accuracy value to each matched term.

According to another aspect of the present disclosure, the instructions, when executed, may cause the processor to implement an automated voting process engine configured to select an algorithm with a maximum hit value as the best match.

According to yet another aspect of the present disclosure, the instructions, when executed, may cause the processor to cause the automated voting process engine to implement a weight-based voting process.

According to a further aspect of the present disclosure, the instructions, when executed, may cause the processor to receive a user's input to confirm or reject the mapping of physical objects or elements in the application; and automatically update the mapping of physical objects or elements in the application based on the received user's input.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
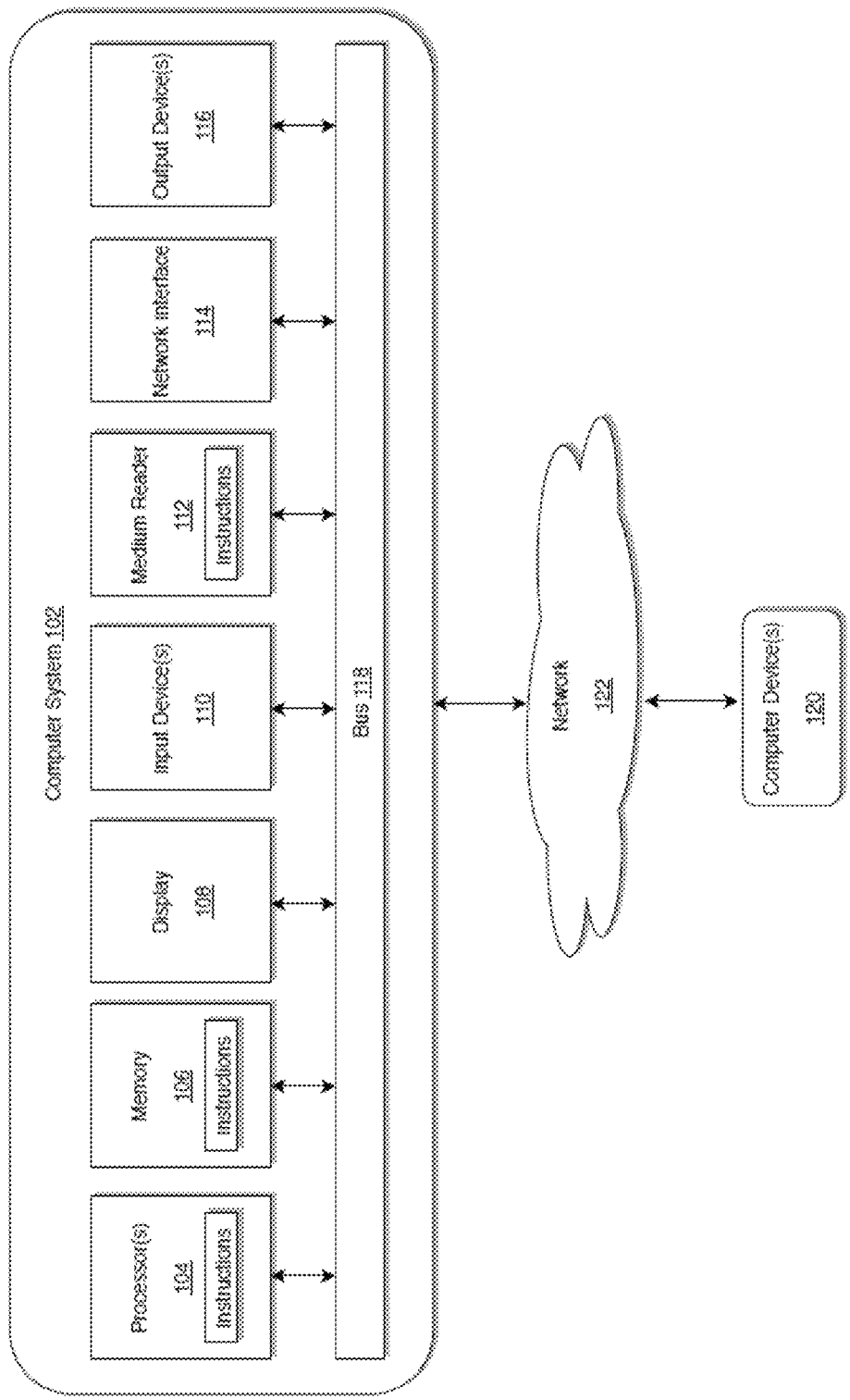
FIG. 1 illustrates a computer system for implementing an automatic mapping device in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, devices, engines, and/or modules. Those skilled in the art will appreciate that these blocks, units, devices, engines, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, devices, engines, and/or modules being implemented by microprocessors or similar, they may be programmed using software (e.g., microcode) to perform various functions discussed herein and may optionally be driven by firmware and/or software. Alternatively, each block, unit, device, engines, and/or module may be implemented by dedicated hardware, or as a combination of dedicated hardware to perform some functions and a processor (e.g., one or more programmed microprocessors and associated circuitry) to perform other functions. Also, each block, unit, device, engine, and/or module of the example embodiments may be physically separated into two or more interacting and discrete blocks, units, devices, engines, and/or modules without departing from the scope of the inventive concepts. Further, the blocks, units, devices, engines, and/or modules of the example embodiments may be physically combined into more complex blocks, units, devices, engines, and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized processes for implementing an automatic mapping module (may also be referred to as an automatic mapping tool) for automatically mapping physical data models or objects to logical data models which in turn are automatically mapped to business terms, thereby significantly reducing data mapping time and eliminating errors in data mapping and automatically detecting and resolving data quality and data lineage issues corresponding to an application in an efficient manner, but the disclosure is not limited thereto.

Figure 2:
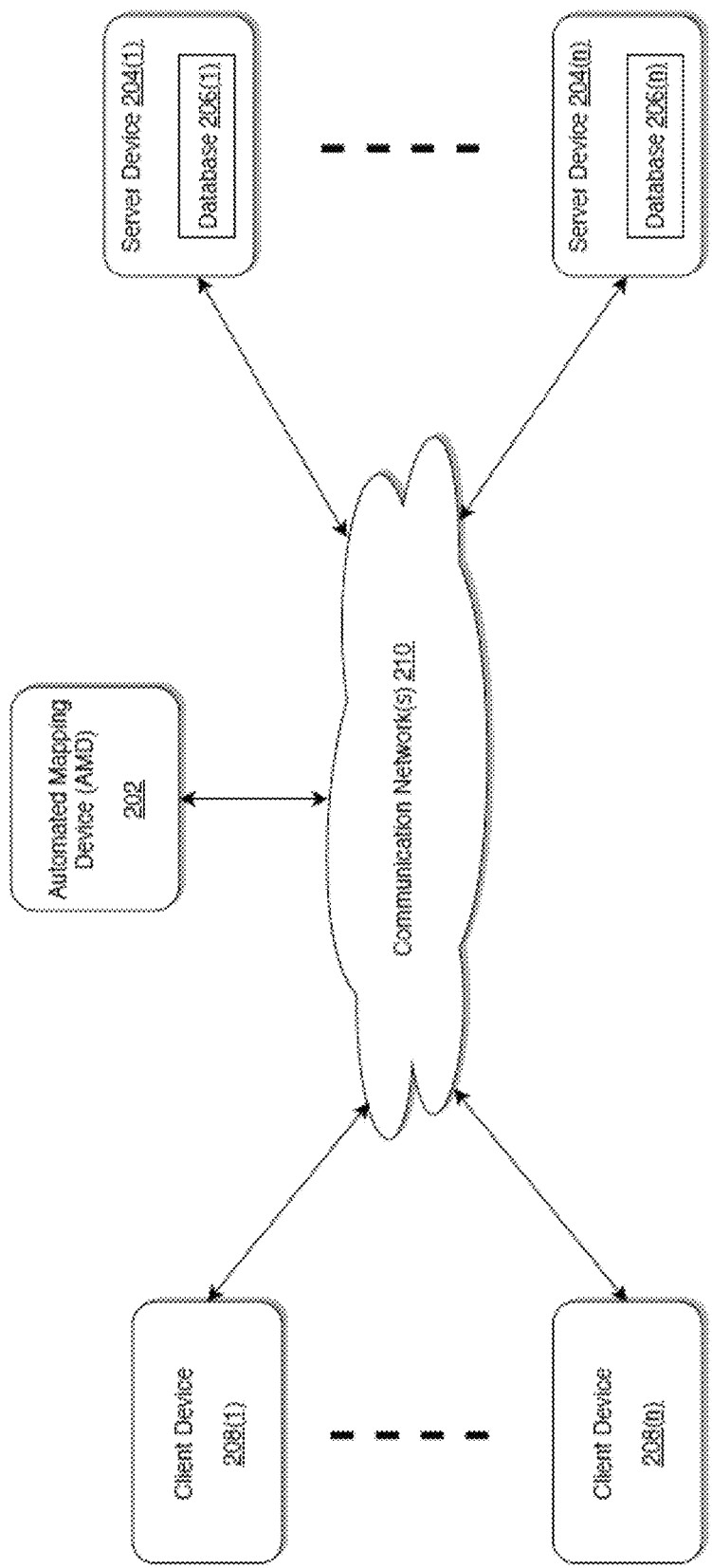
FIG. 2 illustrates an exemplary diagram of a network environment with an automatic mapping device in accordance with an exemplary embodiment.

Referring to FIG. 2, a schematic of an exemplary network environment 200 for implementing an automatic mapping device (AMD) of the instant disclosure is illustrated.

According to exemplary embodiments, the above-described problems associated with conventional system may be overcome by implementing an AMD 202 having an automatic mapping module as illustrated in FIG. 2 by automatically mapping physical data models or objects to logical data models which in turn are automatically mapped to business terms, thereby significantly reducing data mapping time and eliminating errors in data mapping and automatically detecting and resolving data quality and data lineage issues corresponding to an application in an efficient manner, but the disclosure is not limited thereto.

The AMD 202 may be the same or similar to the computer system 102 as described with respect to FIG. 1.

The AMD 202 may store one or more applications that can include executable instructions that, when executed by the AMD 202, cause the AMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the AMD 202 itself, may be located in virtual server(s) running in a cloud-based computing environment rather than being tied to one or more specific physical network computing devices. Also, the application(s) may be running in one or more virtual machines (VMs) executing on the AMD 202. Additionally, in one or more embodiments of this technology, virtual machine(s) running on the AMD 202 may be managed or supervised by a hypervisor.

In the network environment 200 of FIG. 2, the AMD 202 is coupled to a plurality of server devices 204(1)-204(n) that hosts a plurality of databases 206(1)-206(n), and also to a plurality of client devices 208(1)-208(n) via communication network(s) 210. A communication interface of the AMD 202, such as the network interface 114 of the computer system 102 of FIG. 1, operatively couples and communicates between the AMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the AMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s)(WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, tele-traffic in any suitable form (e.g., voice, modem, and the like), Public Switched Telephone Network (PSTNs). Ethernet-based Packet Data Networks (PDNs), combinations thereof, and the like.

The AMD 202 may be a standalone device or integrated with one or more other devices or apparatuses, such as one or more of the server devices 204(1)-204(n), for example, in one particular example, the AMD 202 may be hosted by one of the server devices 204(1)-204(n), and other arrangements are also possible. Moreover, one or more of the devices of the AMD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the AMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the AMD 202 that may be configured for utilizing tools and packages in conjunction with open source to read physical data, map the information (e.g., metadata from the physical data), and assign business terminology, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the AMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the AMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the AMD 202, the server devices 204(1)-204(n), or the client devices 208(1)-208(n), for example, may be configured to operate as virtual instances on the same physical machine. For example, one or more of the AMD 202, the server devices 204(1)-204(n), or the client devices 208(1)-208(n) may operate on the same physical device rather than as separate devices communicating through communication network(s) 210. Additionally, there may be more or fewer AMDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks. Packet Data Networks (PDNs), the Internet, intranets, and combinations thereof.

Figure 3:
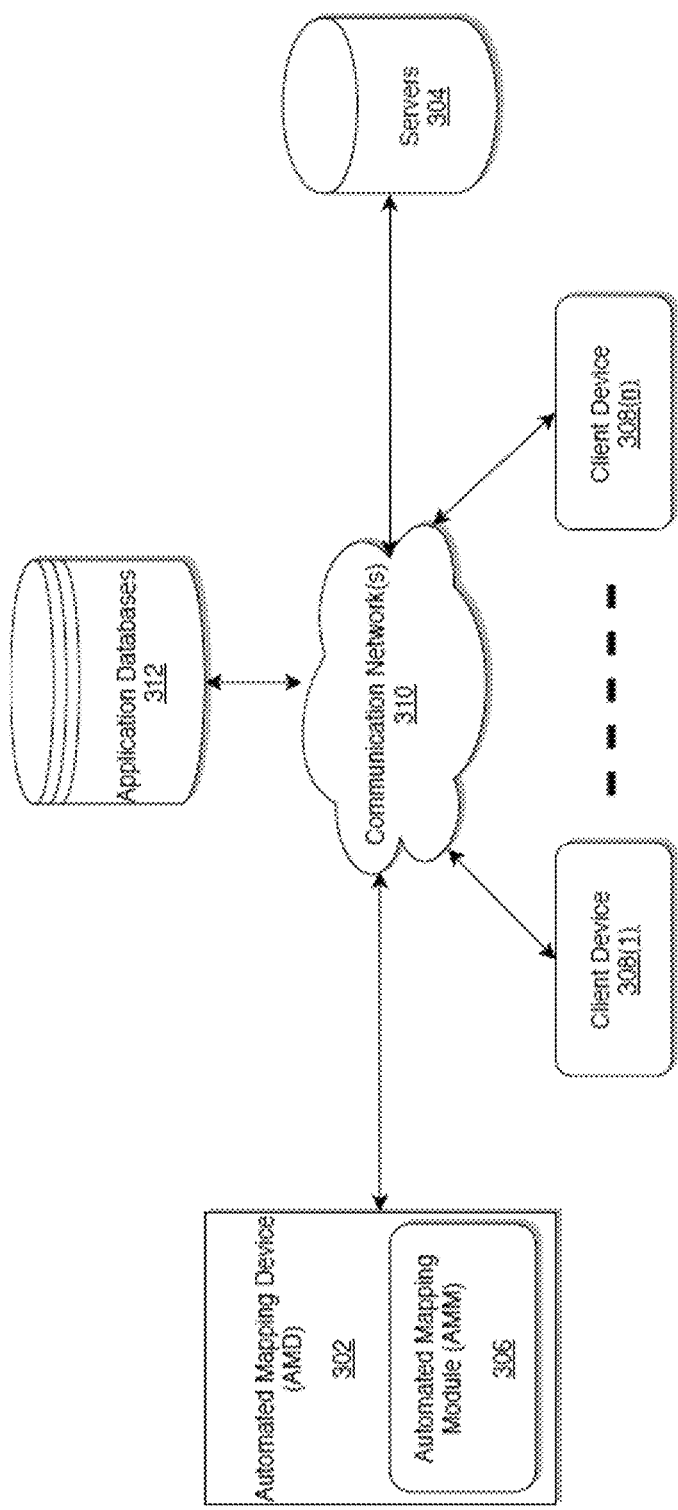
FIG. 3 illustrates a system diagram for implementing an automatic mapping device with an automatic mapping module in accordance with an exemplary embodiment.

FIG. 3 illustrates a system diagram for implementing an AMD with an automatic mapping module (AMM) in accordance with an exemplary embodiment.

As illustrated in FIG. 3, in the system 300, according to exemplary embodiments, the AMD 302 including the AMM 306 may be connected to a plurality of servers 304, a plurality of databases 312, and a plurality of client devices 308(1)-308(n) via a communication network 310, but the disclosure is not limited thereto. For example, according to exemplary embodiments, the AMM 306 may be connected to any desired database besides database 312. According to exemplary embodiments, the database 312 may be configured to store raw physical data model, metadata, rules, taxonomy lists, schema, etc. associated with one or more applications, but the disclosure is not limited thereto. The database 312 may also store a mapped physical data model after automatically mapping the raw physical data model with logic attributes and business terms. The schema may contain tables, and each table may contain columns associated with taxonomy lists across a plurality of line of businesses for applications.

According to exemplary embodiments, the database 312 may also contain inventories of catalog utilized by one or more organizations and inventories of glossaries (i.e., business glossaries utilized by one or more organizations that include logical terms to help run their business activities by utilizing various applications).

According to exemplary embodiments, the implementation of an AMD with an automatic mapping module (AMM) may provide data management architectures and the integration and reporting on metadata within an organization, including the organization's domains (e.g., lines of business, departments, technologies, etc.). For example, the inventory of glossary may be configured to receive data (e.g., logical business terms) from corresponding lines of business computing units. According to exemplary embodiments, the AMD 302 may also receive data from external glossaries. In one exemplary embodiment, graph databases and semantic search technologies may be used to enable the incorporation of a wide array of data sources as well as flexible, intuitive user interfaces.

According to exemplary embodiments, the AMM 306 within the AMD 302 may be configured to access the database 312 that contains the raw physical data model, metadata, rules, taxonomy lists, schema, etc. associated with one or more applications, but the disclosure is not limited thereto.

For example, according to exemplary embodiments, the AMM 306 may be configured to obtain all columns associated with a particular application and store them into an inventory and then apply artificial intelligence (AI) machine learning (ML) routines and matching algorithms for matching the columns to Englishify terms. One of ordinary skill the art would readily recognize that any desired known AI ML routines and matching algorithms may be utilized by the AMM 306 to obtain an optimal matching result. For example, physical object/table name for columns/attributes that are too generic; such as 'Start date' or 'End date,' could be clubbed by the AMM 306 with the table name (e.g., Account) to mean Account Start Date or Account End Date etc., but the disclosure is not limited thereto. Similarly, when the AMM 306 returns a search result for a term ACCT_NM, it converts that term to an English term "account number."

The AMM 306 then scans the inventory of glossary of an organization and generates a match, thereby updates the columns with the content of the columns (e.g., ACCT_NM) and a logical definition of what that column is (e.g., account number). According to exemplary embodiments, the AMM 306 may scan metadata of the data received from the line of business computing units to generate/update the inventory of glossary.

As it will be discussed in more details below, the AMM 306 may be configured to access the database 312 that includes a raw physical data model of an application; extract the raw physical data model of the application from the database 312; convert physical object names associated with the raw physical data model into English terms based on a taxonomy expansion list; apply a plurality of standardization and contextualization rules to the English terms generated from converting the physical object names; output names based on applying the plurality of standardization and contextualization rules to the English terms; apply fuzzy logic and machine learning routines and matching algorithms for matching the names to predefined logical terms; and automatically generating a mapping of physical objects or elements in the application with logical attributes and related business terms, but the disclosure is not limited thereto.

According to exemplary embodiment, the AMD 302 is described and shown in FIG. 3 as including the AMM 306, although it may include other rules, policies, modules, databases, or applications, for example.

According to exemplary embodiments, the server 304 may be the same or equivalent to the server device 204 as illustrated in FIG. 2.

The process may be executed via the communication network 310, which may comprise plural networks as described above. For example, in an exemplary embodiment, the databases 312, server 304 and the client devices 308(1)-308(n) may communicate with the AMD 302 via broadband or cellular communication. Of course, these embodiments are merely exemplary and are not limiting or exhaustive.

Figure 4:
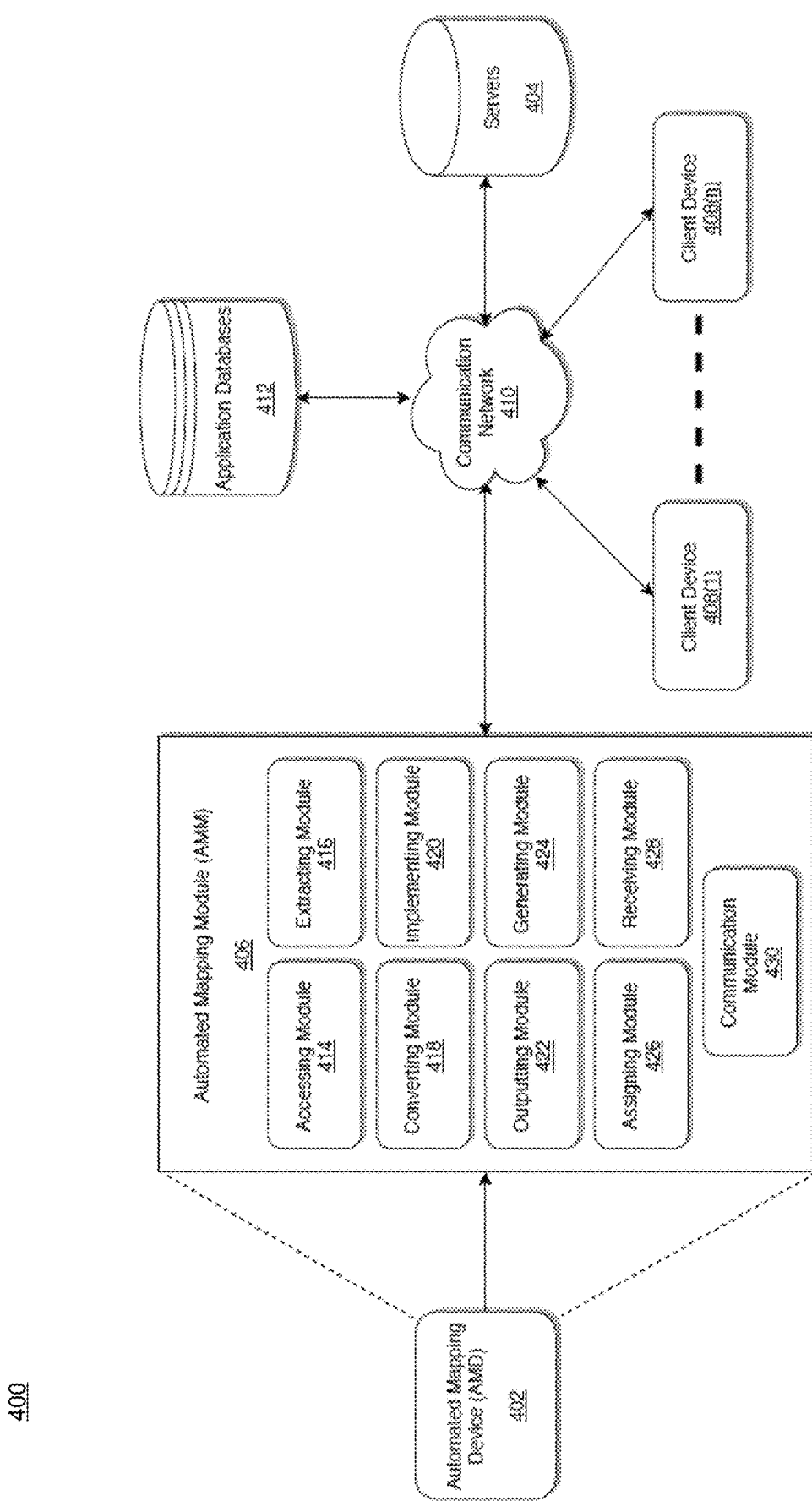
FIG. 4 illustrates a system diagram for implementing an automatic mapping module of FIG. 3 in accordance with an exemplary embodiment.

FIG. 4 illustrates a system diagram for implementing an automatic mapping module of FIG. 3 in accordance with an exemplary embodiment. As illustrated in FIG. 4, the system 400 may include an AMD 402 within which an AMM 406 may be embedded, databases 412, servers 404, and a communication network 410.

As illustrated in FIG. 4, the AMM 406 may include an accessing module 414, an extracting module 416, a converting module 418, an implementing module 420, an outputting module 422, a generating module 424, an assigning module 426, a receiving module 428, and a communication module 430. According to exemplary embodiments, the databases 412 may be external to the AMD 402 and the AMD 402 may include various systems that are managed and operated by an organization. The databases 412 may be the same or similar to the databases 312 as illustrated in FIG. 3. Thus, the databases 412 may also contain raw physical data models, metadata, rules, taxonomy lists, schema, etc. associated with one or more applications, but the disclosure is not limited thereto. Further, the databases 412 may also contain inventories of catalog and inventories of glossaries of one or more organizations and the inventories of glossaries may obtain data and/or metadata from various line of business computing units.

The process may be executed via the communication network 410, which may comprise plural networks as described above. For example, in an exemplary embodiment, the various components of the AMM 406 may communicate with the servers 404, the client devices 408(1)-408(n), and the databases 412 via the communication module 430 and the communication network 410. Of course, these embodiments are merely exemplary and are not limiting or exhaustive.

According to exemplary embodiments, the communication module 424 may be configured to establish a link between the databases 412, servers 404, and the client devices 408(1)-408(n) via the communication network 410.

According to exemplary embodiments, each of the accessing module 414, an extracting module 416, a converting module 418, an implementing module 420, an outputting module 422, a generating module 424, an assigning module 426, a receiving module 428, and a communication module 430 may be implemented by microprocessors or similar, they may be programmed using software (e.g., microcode) to perform various functions discussed herein. Alternatively, each of the accessing module 414, an extracting module 416, a converting module 418, an implementing module 420, an outputting module 422, a generating module 424, an assigning module 426, a receiving module 428, and a communication module 430 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the accessing module 414, an extracting module 416, a converting module 418, an implementing module 420, an outputting module 422, a generating module 424, an assigning module 426, a receiving module 428, and a communication module 430 may be physically separated into two or more interacting and discrete blocks, units, devices, and/or modules without departing from the scope of the inventive concepts.

According to exemplary embodiments, data may be registered when first introduced into the organization, and may be loaded from lines of business computing units, external sources, etc. The data registration may record the metadata of incoming reservoir sources data by conforming to a model. This model may define, for example, the type of data that will be received, what meaning the data has to the organization, and what standard the data should follow.

According to exemplary embodiments, lines of business may be subunits within an organization. In one embodiment, the relationship between one or more of lines of business may be based on an organizational chart, etc.

Application catalog may maintain a listing of some or all applications within an organization. In one embodiment, application catalog may identify which lines of business may use or be responsible for an application.

According to exemplary embodiments, the system 400 for implementing AMM 406 may include a database 412 that includes a raw physical data model of an application. According to exemplary embodiments, the accessing module 414 may be configured to access the database 412 that includes a raw physical data model of an application. The extracting module 416 may be configured to extract the raw physical data model of the application from the database 412. The converting module 418 may be configured to convert physical object names associated with the raw physical data model into English terms based on a taxonomy expansion list. The implementing module 420 may be configured to apply a plurality of standardization and contextualization rules to the English terms generated from converting the physical object names. The outputting module 422 may be configured to output names based on applying the plurality of standardization and contextualization rules to the English terms. The implementing module 420 may be further configured to applying fuzzy logic and/or machine learning routines and matching algorithms for matching the names to predefined logical terms; and the generating module 424 may be configured to automatically generate a mapping of physical objects or elements in the application with logical attributes and related business terms.

Figure 5:
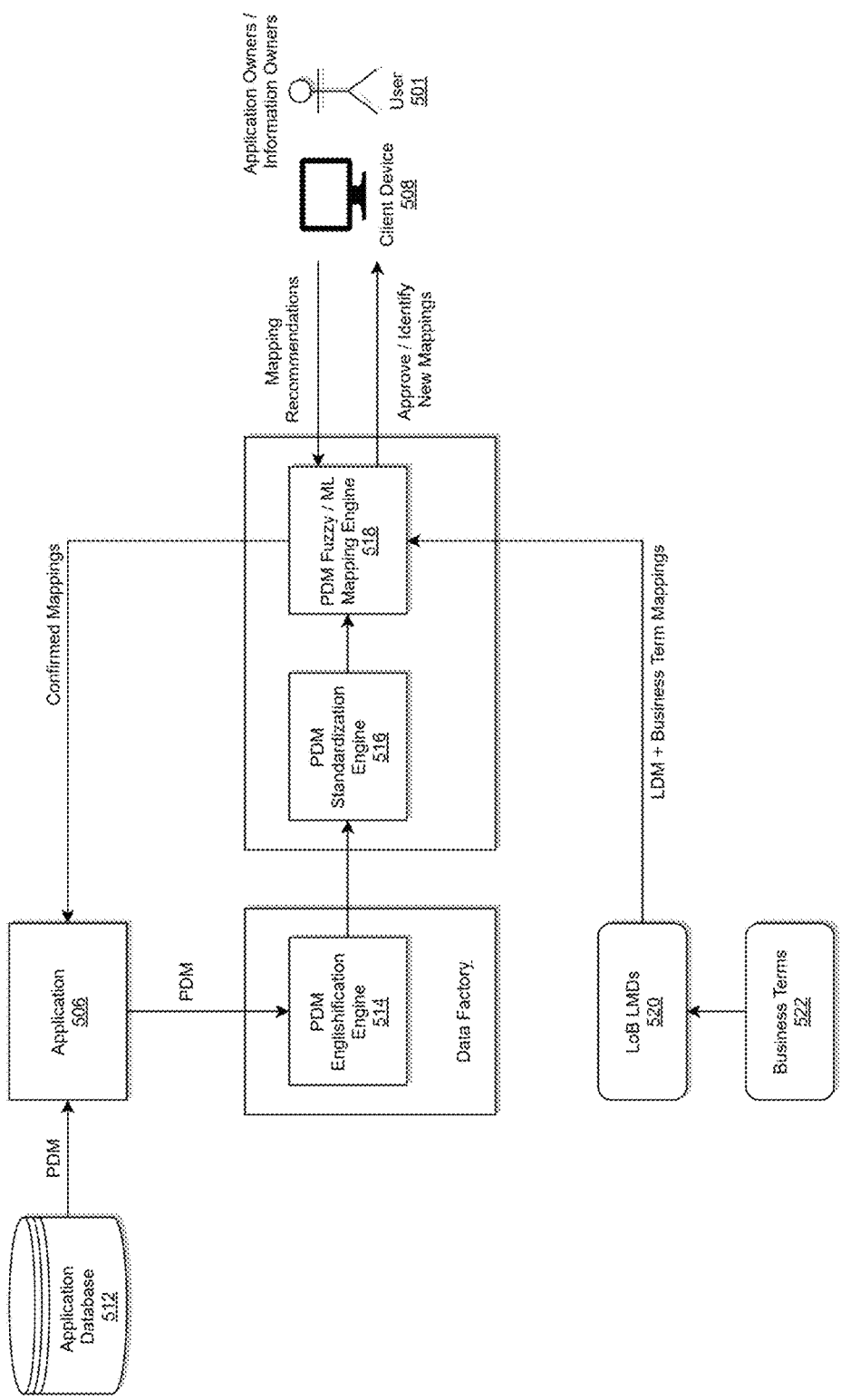
FIG. 5 illustrates an exemplary diagram of automatically generating a mapped physical data model (PDM) in accordance with an exemplary embodiment.

FIG. 5 illustrates an exemplary network diagram 500 of automatically generating a mapped physical data model (PDM) in accordance with an exemplary embodiment.

As illustrated in FIG. 5, the exemplary network diagram 500 includes an application database 512 that is operatively connected to an application 506. The application 506, according to exemplary embodiments, may be operatively connected to a PDM Englishification engine 514 which may be referred to as a data factory, a PDM standardization engine 516, and a PDM fuzzy/ML mapping engine 518. Details of the PDM standardization engine 516 and the PDM fuzzy/ML mapping engine 518 are illustrated in FIG. 6.

Figure 6:
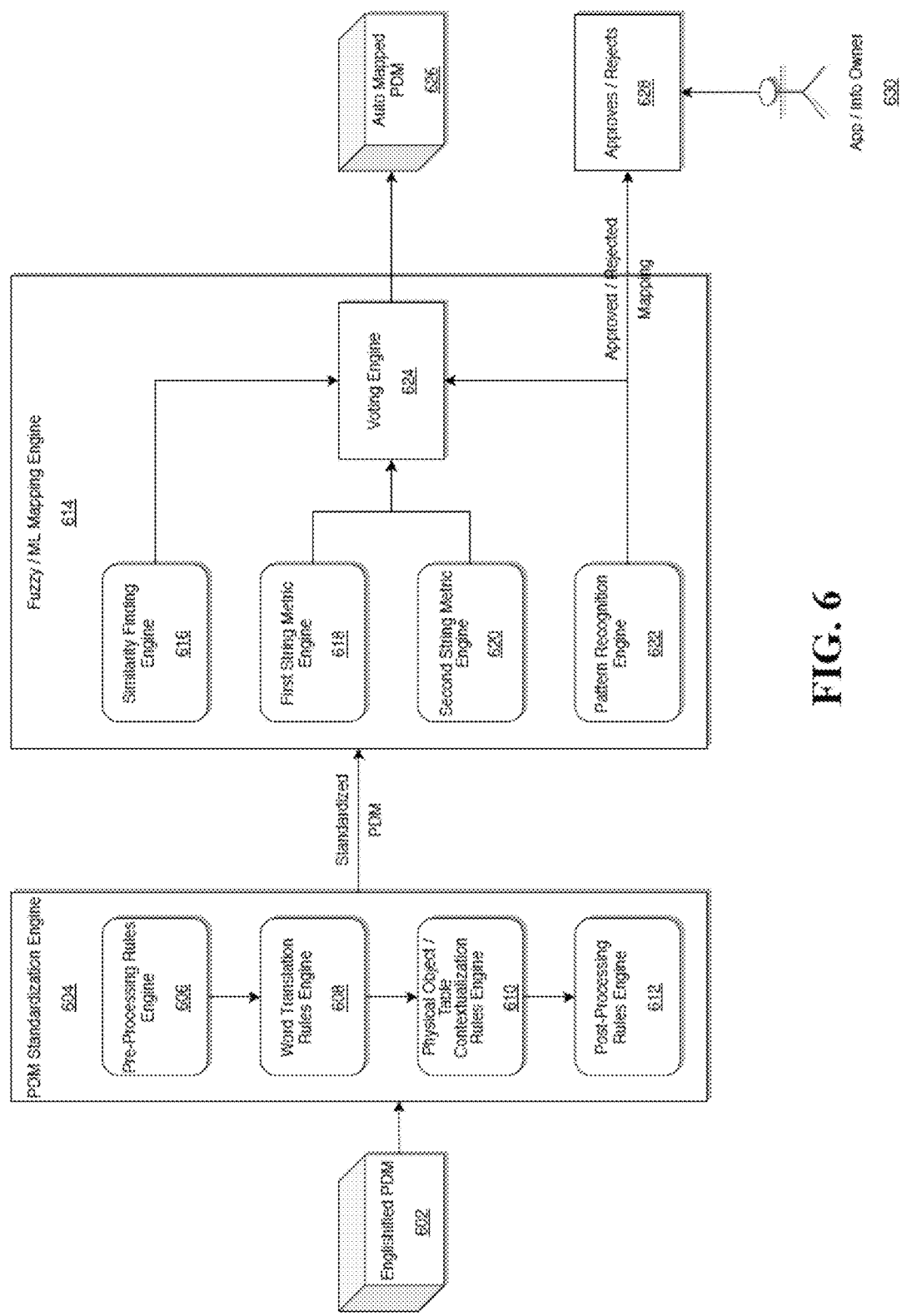
FIG. 6 illustrates an exemplary PDM standardization and fuzzy/machine learning (ML) mapping schematic for automatically generating a mapped PDM in accordance with an exemplary embodiment.

FIG. 6 illustrates an exemplary PDM standardization and fuzzy/ML mapping schematic 600 in automatically generating a mapped PDM 626 in accordance with an exemplary embodiment. As illustrated in FIG. 6, the PDM standardization and fuzzy/ML mapping schematic 600 may include a PDM standardization engine 604 that is operatively connected with a fuzzy/ML mapping engine 614. The PDM standardization engine 604 may include a pre-processing rules engine 606, a word translation rules engine 608, a physical object/table contextualization rules engine 610, and a post-processing rules engine 612, but the disclosure is not limited thereto. The pre-processing rules engine 606 may be operatively connected with the word translation rules engine 608. The word translation rules engine 608 may be operatively connected with the physical object/table contextualization rules engine 610, and the physical object/table contextualization rules engine 610 may be operatively connected with the post-processing rules engine 612.

According to exemplary embodiments, the fuzzy/ML mapping engine 614 may include a similarity finding engine 616, a first string metric engine 618, a second string metric engine 620, a pattern recognition engine 622, and a voting engine 624.

As it will be understood by an ordinary skill in the art that any similarity finding engine 616 may be implemented by the instant disclosure. An exemplary similarity finding engine 616 may include, but not limited thereto, is Jaccard. The similarity finding engine 616 may be configured to implement statistic used for gauging the similarity and diversity of sample sets. For example, the similarity finding engine 616 may implement Jaccard coefficient that measures similarity between finite sample sets, which is defined as the size of the intersection divided by the size of the union of the sample sets. The statistic used for gauging the similarity and diversity of sample sets. The similarity finding engine 616 may calculate Jaccard distance, which measures dissimilarity between sample sets, by subtracting the Jaccard coefficient from 1, or, equivalently, by dividing the difference of the sizes of the union and the intersection of two sets by the size of the union.

According to exemplary embodiments, the fuzzy/ML mapping engine 614 may also include a first string metric engine 618 which may be configured to implement, e.g., Levenish algorithm and a second string metric engine 620 which may be configured to implement, e.g., Jaro-Winkler algorithm. The fuzzy/ML mapping engine 614 may also include a pattern recognition engine 622 which may be configured to implement, e.g., Radcliff-Obershelp algorithm. For example, the pattern recognition engine 622 may be configured to compute the similarity of two strings as the number of matching characters divided by the total number of characters in the two strings. According to exemplary embodiments, the matching characters are those in the longest common subsequence plus, recursively, matching characters in the unmatched region on either side of the longest common subsequence.

According to exemplary embodiments, the similarity finding engine 616, the first string metric engine 618, the second string metric engine 620, and the pattern recognition engine 622 may all be operatively connected with the voting engine 624. The voting engine 624 may be configured to implement a weight-based voting algorithm.

Referring to FIGS. 4, 5, and 6, according to exemplary embodiments, the accessing module 414 may be configured to access the database 412, 512 that includes a raw physical data model of an application 506. The extracting module 416 may be configured to extract the raw physical data model of the application 506 from the database 412, 512. The PDM Englishification engine 514 may receive the PDM from the application 506 and the converting module 418 (which may also be embedded within the PDM Englishification engine 514) may be configured to convert physical object names associated with the raw physical data model into English terms based on a taxonomy expansion list and output an Englishified PDM 602. The taxonomy expansion list may be aggregated across a plurality of line of businesses (LOBs), but the disclosure is not limited thereto.

The implementing module 420 may be configured to implement the PDM standardization engine 516, 604 to apply a plurality of standardization rules to the English terms included in the Englishified PDM 602 generated from converting the physical object names.

For example, the pre-processing rules engine 606 may be configured to implement an algorithm to move a sub-string of each English term from a beginning to an end. The word translation rules engine 608 may be configured to implement an algorithm to replace a flag with an indicator or to replace a person text to an individual. The physical object/table contextualization rules engine 610 may be configured to implement an algorithm to combine a generic name for a column or an attribute to a table name. For example, physical object/table name for columns/attributes that are too generic; such as 'Start date' or 'End date,' could be clubbed by the physical object/table contextualization rules engine 610 with the table name (e.g., Account) to mean Account Start Date or Account End Date etc., but the disclosure is not limited thereto.

According to exemplary embodiments, the post-processing rules engine 612 may be configured to implement an algorithm to remove any duplicates in a column or an attribute name.

As illustrated in FIGS. 5 and 6, according to exemplary embodiments, the PDM standardization engine 516, 604 receives LOB logical data models 520 and business terms 522 to generate the standardized PDM. The standardized PDM is received by the fuzzy/ML mapping engine 518, 614 which implements various artificial intelligence and/or machine learning routines and matching algorithms by implementing, for example, the similarity finding engine 616, first string metric engine 618, second string metric engine 620, and the pattern recognition engine 622. For example, the fuzzy/ML mapping engine 518, 614 may implement an algorithm to utilize text length or tokenization algorithms to identify a best match against the predefined logical terms (e.g., LOB logical data models 520) or business terms 522 and assign a probability of accuracy value to each matched term.

According to exemplary embodiments, the tool disclosed herein may be configured to provide ability to find a best match with the ability for a user to seek for top recommendations based on the learning algorithm that would allow the user to pick from. Failing which the user can search of a logical attribute/business term (new) which will then be incorporated into the learning process as well.

According to exemplary embodiments, the voting engine 624 may be configured to implement an automated voting process to select an algorithm with a maximum hit value as the best match. According to exemplary embodiments, the voting engine 624 may implement a weight-based voting process.

The outputting module 422 may be configured to output names based on applying the plurality of standardization rules to the English terms as disclosed above. The implementing module 420 may be further configured to applying artificial intelligence and/or machine learning routines and matching algorithms for matching the names to predefined logical terms or business terms as disclosed above. The generating module 424 may be configured to implement the fuzzy/ML mapping engine 518, 614 and their specific engines as disclosed above to automatically generate an auto mapped physical data model 626 of the application 506 that is mapped with the matched terms. The mapped physical data model 626 includes a mapping of physical objects or elements in the application 506 with logical attributes and related business terms.

According to exemplary embodiments, a user 501 or app/info owner 630 may provide user's input to approve or reject 628 the auto mapped physical data model 626. The AMM 406 may be configured to automatically update the auto mapped physical data model 626 based on the received user's input. For example, if the auto mapped physical data model 626 is rejected by the user 501 or app/info owner 630 by utilizing the client device 508, the rejected auto mapped physical data model 626 may be fed-back into the fuzzy/ML mapping engine 518, 614 again and the auto mapped physical data model 626 will go through the matching algorithms described above based on received user's input to generate another updated auto mapped PDM 626. According to exemplary embodiments, the weightage given to human overrides can be based on a count (depending on how many are constantly changing A→B, which will override any of the fuzzy logic matching algorithms suggested by the fuzzy/ML mapping engine 518, 614.

The AMM 406 may be configured to receive metadata from organizational metadata repository, which may include a glossary of critical data elements, a Logical Data Model (LDM), a message schema, etc. According to exemplary embodiments, these elements may be defined by the organization. In another embodiment, machine learning may be used to update the glossary and models as is necessary and/or desired. For example, a "Country" message filed "country Id" may be traced to an LDM that defines a "Country" data entity and its each attribute has a lineage to a critical data element (CDE) "Country Code" defined in a business glossary. In this context, an LDM represents the organization's data as it is understood by the business. A business glossary may establish common terminology across different applications and groups within the organization.

According to exemplary embodiments, the AMM 406 may be configured to employ machine learning and/or artificial intelligence to identify potential data exposures and matching columns within tables of a schema to logical terms. In one embodiment, the AMM 406 may continuously monitor data throughout an organization in real-time.

According to exemplary embodiments, the AMM 406 may be configured to match the taxonomies (e.g., Englishify terms) with the corresponding predefined logical terms (e.g., business terms) and the assigning module 426 may be configured to assign a probability of accuracy value to the matched terms. The AMM 406 may be configured to populate a data catalog with the matched terms when the assigned probability of accuracy value satisfies a predetermined threshold value.

According to exemplary embodiments, the AMM 406 may be configured to provide right level of standardization rules that can be used across a wide array of applications.

According to exemplary embodiments, the AMM 406 may be configured to provide multiple suggestions (than a singular value) based on user feedback (received from the user 501 or the app/info owner 630) underpinned by a predefined ranking algorithm which enables quicker identification of relevant matches, thereby accelerating the overall mapping activity. The confirmed mappings are then made available back to the applications to enrich their metadata and also to tools that enables data discoverability.

According to exemplary embodiments, the AMM 406 may be configured to implement a crawling feature that, upon user confirmation on the mapping suggestions received from the user 501 or the app/info owner 630, crawls through the database (i.e., application database 312, 412, 512) searching for attribute. If the attribute exits elsewhere in the application, the AMM 406 may automatically prompt the user 501 or the app/info owner 630 to confirm the mappings for each instance of the attribute, thereby accelerating the mapping process and making sure that the mappings are consistent.

Figure 7:
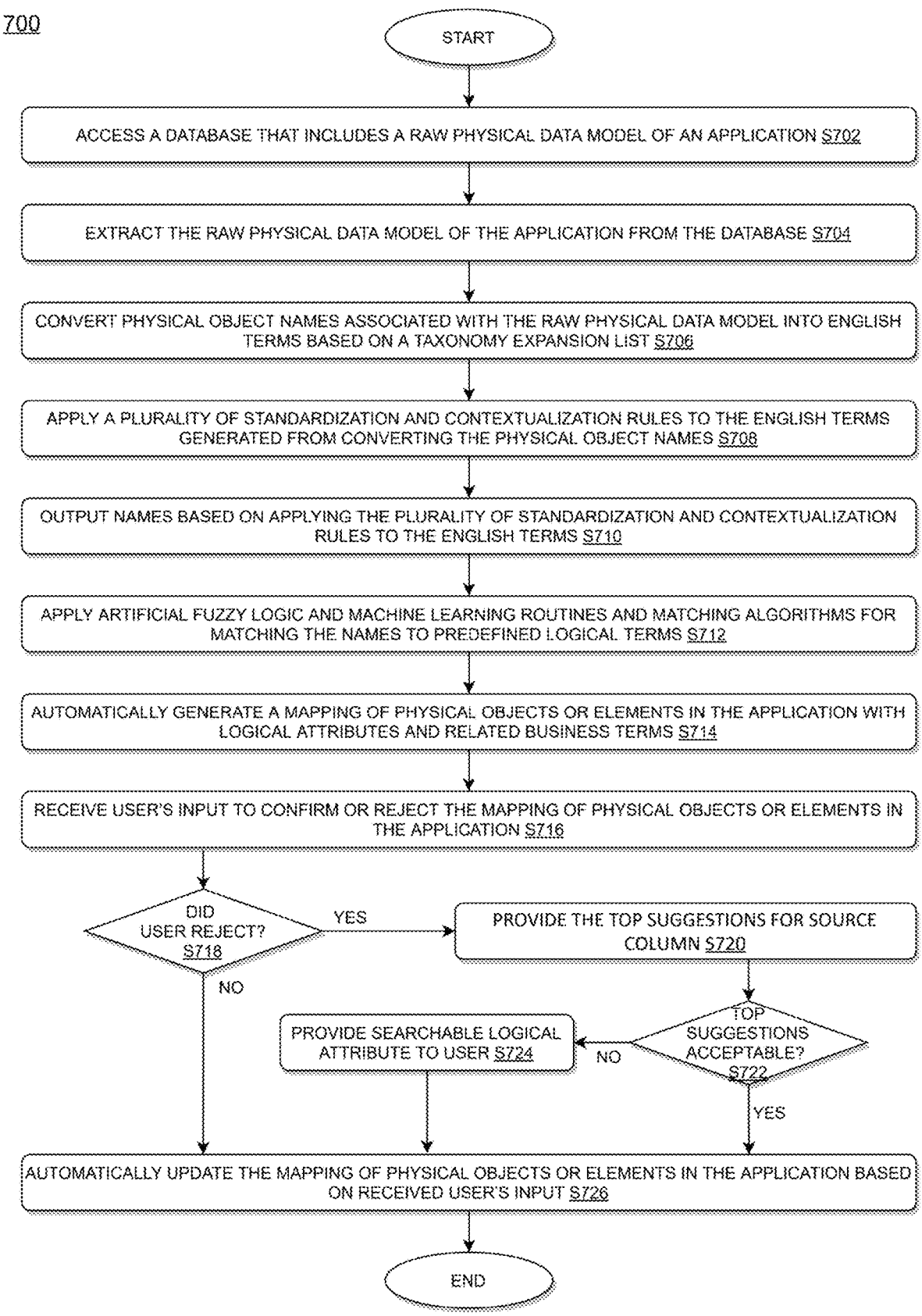
FIG. 7 illustrates a flow chart for implementing an automatic mapping module in accordance with an exemplary embodiment.

FIG. 7 illustrates a flow chart for implementing an automatic mapping module is disclosed. It will be appreciated that the illustrated process 700 and associated steps may be performed in a different order, with illustrated steps omitted, with additional steps added, or with a combination of reordered, combined, omitted, or additional steps.

As illustrated in FIG. 7, at step S702 of the process 700, a database may be accessed by a processor. The database may include a raw physical data model of an application.

According to exemplary embodiments, at step S704 of the process 700, the raw physical data model of the application may be extracted from the database.

At step S706 of the process 700, physical object names associated with the raw physical data model may be converted into English terms based on a taxonomy expansion list.

At step S708 of the process 700, a plurality of standardization and contextualization rules may be applied to the English terms generated from converting the physical object names.

At step S710 of the process 700, names may be outputted based on applying the plurality of standardization and contextualization rules to the English terms.

At step S712 of the process 700, fuzzy logic and machine learning routines and matching algorithms may be applied for matching the names to predefined logical terms.

At step S714, a mapping of physical objects or elements in the application with logical attributes and related business terms may be automatically generated.

At step S716 of the process 700, a user's input may be received to confirm or reject the mapping of physical objects or elements in the application.

At step S718, it may be determined whether the user rejected the mapping (i.e., default mapping) of physical objects or elements in the application.

If at step S718, the user input indicates that the user did not reject the mapping (i.e., confirmed the mapping), at step S726 of the process 700, the mapping of physical objects or elements in the application may be automatically updated based on the received user's input of confirming the mapping.

If at step S718, the user input indicates that the user rejected the mapping, at step S720 of the process 700, top suggestions for source column for mapping may be provided to user for user's selection.

At step S722, it may be determined whether the top suggestions are acceptable by the user. If at step S722, it is determined that the top suggestions are acceptable by the user, the mapping of physical objects or elements in the application may be automatically updated based on the received user's input of confirming the mapping selected from the top suggestions.

If at step S722, it is determined that the top suggestions are not acceptable by the user, at step S724 of the process 700, searchable logical attributes may be provided to the user, and at step S726 of the process 700, the mapping of physical objects or elements in the application may be automatically updated based on the received user's input selected from the searchable logical attributes. This will then be incorporated into the learning algorithm.

According to exemplary embodiments, the process 700 may provide multiple suggestions (than a singular value) based on user feedback underpinned by a predefined ranking algorithm which enables quicker identification of relevant matches, thereby accelerating the overall mapping activity. The confirmed mappings are then made available back to the applications to enrich their metadata and also to tools that enables data discoverability.

According to exemplary embodiments, the process 700 may implement a crawling feature that, upon user confirmation on the mapping suggestions, crawls through a database searching for attribute. If the attribute exits elsewhere in the application, the process 700 will automatically prompt the user to confirm the mappings for each instance of the attribute, thereby accelerating the mapping process and making sure that the mappings are consistent.

According to exemplary embodiments, wherein the standardization process of the process 700 may include: implementing a pre-processing rule engine configured to move a sub-string of each English term from a beginning to an end; implementing a word translation rule engine configured to replace a flag with an indicator or to replace a person text to an individual; implementing a physical object/table contextualization engine configured to combine a generic name for a column or an attribute to a table name; and implementing a post-processing rule engine configured to remove any duplicates in a column or an attribute name.

According to exemplary embodiments, in the process 700, the taxonomy expansion list may be aggregated across a plurality of line of businesses (LOBs).

According to exemplary embodiments, wherein the applying artificial intelligence and/or machine learning routines and matching algorithms of the process 700 may include: implementing a fuzzy matching rule engine configured to utilize text length or tokenization algorithms to identify a best match against the predefined logical terms; and assigning a probability of accuracy value to each matched term.

According to exemplary embodiments, the process 700 may further include: implementing an automated voting process engine configured to select an algorithm with a maximum hit value as the best match.

According to exemplary embodiments, in the process 700, the automated voting process engine may implement a weight-based voting process.

According to exemplary embodiments, the process 700 may further include: receiving a user's input to confirm or reject the mapping of physical objects or elements in the application; and automatically updating the mapping of physical objects or elements in the application based on the received user's input.

According to exemplary embodiments, a non-transitory computer readable medium may be configured to store instructions for implementing an automatic mapping module is disclosed. According to exemplary embodiments, the instructions, when executed, may cause a processor embedded within the AMM 406 or the AMD 402 to perform the following: accessing a database that includes a raw physical data model of an application; extracting the raw physical data model of the application from the database; converting physical object names associated with the raw physical data model into English terms based on a taxonomy expansion list; applying a plurality of standardization and contextualization rules to the English terms generated from converting the physical object names; outputting names based on applying the plurality of standardization and contextualization rules to the English terms; applying fuzzy logic and machine learning routines and matching algorithms for matching the names to predefined logical terms; and automatically generating a mapping of physical objects or elements in the application with logical attributes and related business terms. The processor may be the same or similar to the processor 104 as illustrated in FIG. 1 or the processor embedded within AMD 202, AMD 302, AMM 306, AMD 402, and AMM 406.

According to exemplary embodiments, the instructions, when executed, may cause the processor 104 to provide multiple suggestions (than a singular value) based on user feedback underpinned by a predefined ranking algorithm which enables quicker identification of relevant matches, thereby accelerating the overall mapping activity. The confirmed mappings are then made available back to the applications to enrich their metadata and also to tools that enables data discoverability.

According to exemplary embodiments, the instructions, when executed, may cause the processor 104 to execute a crawling feature that, upon user confirmation on the mapping suggestions, crawls through a database searching for attribute. If the attribute exits elsewhere in the application, the processor 104 will automatically prompt the user to confirm the mappings for each instance of the attribute, thereby accelerating the mapping process and making sure that the mappings are consistent.

According to exemplary embodiments, wherein in the standardization process, the instructions, when executed, may cause the processor 104 to implement a pre-processing rule engine configured to move a sub-string of each English term from a beginning to an end; implement a word translation rule engine configured to replace a flag with an indicator or to replace a person text to an individual; implement a physical object/table contextualization engine configured to combine a generic name for a column or an attribute to a table name; and implement a post-processing rule engine configured to remove any duplicates in a column or an attribute name.

According to exemplary embodiments, the instructions, when executed, may cause the processor 104 to aggregate the taxonomy expansion list across a plurality of line of businesses (LOBs).

According to exemplary embodiments, wherein in applying artificial intelligence and/or machine learning routines and matching algorithms, the instructions, when executed, may cause the processor 104 to implement a fuzzy matching rule engine configured to utilize text length or tokenization algorithms to identify a best match against the predefined logical terms; and assign a probability of accuracy value to each matched term.

According to exemplary embodiments, the instructions, when executed, may cause the processor 104 to implement an automated voting process engine configured to select an algorithm with a maximum hit value as the best match.

According to exemplary embodiments, the instructions, when executed, may cause the processor 104 to cause the automated voting process engine to implement a weight-based voting process.

According to exemplary embodiments, the instructions, when executed, may cause the processor 104 to receive a user's input to confirm or reject the mapping of physical objects or elements in the application; and automatically update the mapping of physical objects or elements in the application based on the received user's input.

According to exemplary embodiments as disclosed above in FIGS. 1-7, technical improvements effected by the instant disclosure may include platforms for implementing an automatic mapping module for automatically mapping physical data models or objects to logical data models which in turn are automatically mapped to business terms, thereby significantly reducing data mapping time and eliminating errors in data mapping and automatically detecting and resolving data quality and data lineage issues corresponding to an application in an efficient manner, but the disclosure is not limited thereto. According to exemplary embodiments as disclosed above in FIGS. 1-7, technical improvements effected by the instant disclosure may further include platforms for implementing an automatic mapping module that may be configured to automatically provide a "best match" based on the physical object name to equivalent logical attribute or business term, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signal such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an automatic mapping module by utilizing one or more processors and one or more memories, the method comprising:
   converting physical object names associated with raw physical data model of an application received from a database into English terms based on a taxonomy expansion list;
   applying a plurality of standardization and contextualization rules to the English terms generated from converting the physical object names;
   outputting names based on applying the plurality of standardization and contextualization rules to the English terms;
   applying fuzzy logic and machine learning routines and matching algorithms for matching the names to predefined logical terms to identify potential data exposures and matching columns within tables of a schema to the predefined logical terms;
   automatically generating a mapping of physical objects or elements in the application with logical attributes and related business terms,
   wherein the applying fuzzy logic and machine learning routines and matching algorithms further comprising:
   implementing a fuzzy matching rule engine configured to utilize text length or tokenization algorithms to identify a best match against the predefined logical terms; and
   assigning a probability of accuracy value to each matched term;
   implementing an automated voting process engine, that implements a weight-based voting process, configured to select an algorithm with a maximum hit value as the best match; and
   populating a data catalog with the matched terms when the assigned probability of accuracy value satisfies a predetermined threshold value.

2. The method according to claim 1, further comprising:
implementing a pre-processing rule engine configured to move a sub-string of each English term from a beginning to an end;
implementing a word translation rule engine configured to replace a flag with an indicator or to replace a person text to an individual;
implementing a physical object/table contextualization engine configured to combine a generic name for a column or an attribute to a table name; and
implementing a post-processing rule engine configured to remove any duplicates in a column or an attribute name.

3. The method according to claim 1, wherein the taxonomy expansion list is aggregated across a plurality of line of businesses (LOBs).

4. The method according to claim 1, further comprising:
receiving a user's input to confirm or reject the mapping of physical objects or elements in the application; and
automatically updating the mapping of physical objects or elements in the application based on the received user's input.

5. The method according to claim 1, further comprising:
providing a plurality of mapping suggestions based on user feedback underpinned by a predefined ranking algorithm;
receiving user confirmation on confirmed mappings based on the plurality of mapping suggestions; and
utilizing the confirmed mappings to enrich metadata of the application.

6. The method according to claim 5, further comprising:
implementing a crawling feature that, upon receiving user confirmation on the plurality of mapping suggestions, crawls through the database searching for attribute.

7. The method according to claim 6, wherein, when the attribute exists elsewhere in the application, the method further comprising:
automatically prompting the user to confirm the mappings for each instance of the attribute.

8. A system for implementing an automatic mapping module, the system comprising:
a processor; and
a memory operatively connected to the processor via a communication interface, the memory storing computer readable instructions, when executed, causes the processor to:
convert physical object names associated with raw physical data model of an application received from a database into English terms based on a taxonomy expansion list;
apply a plurality of standardization and contextualization rules to the English terms generated from converting the physical object names;
output names based on applying the plurality of standardization and contextualization rules to the English terms;
apply fuzzy logic and machine learning routines and matching algorithms for matching the names to predefined logical terms to identify potential data exposures and matching columns within tables of a schema to the predefined logical terms; and
automatically generate a mapping of physical objects or elements in the application with logical attributes and related business terms,
wherein the applying fuzzy logic and machine learning routines and matching algorithms further comprising:
implementing a fuzzy matching rule engine configured to utilize text length or tokenization algorithms to identify a best match against the predefined logical terms; and
assigning a probability of accuracy value to each matched term;
implementing an automated voting process engine, that implements a weight-based voting process, configured to select an algorithm with a maximum hit value as the best match; and
populating a data catalog with the matched terms when the assigned probability of accuracy value satisfies a predetermined threshold value.

9. The system according to claim 8, wherein the processor is further configured to:
implement a pre-processing rule engine configured to move a sub-string of each English term from a beginning to an end;
implement a word translation rule engine configured to replace a flag with an indicator or to replace a person text to an individual;
implement a physical object/table contextualization engine configured to combine a generic name for a column or an attribute to a table name; and
implement a post-processing rule engine configured to remove any duplicates in a column or an attribute name.

10. The system according to claim 8, wherein the processor is further configured to aggregate the taxonomy expansion list across a plurality of line of businesses (LOBs).

11. The system according to claim 8, the processor is further configured to:
receive a user's input to confirm or reject the mapping of physical objects or elements in the application; and
automatically update the mapping of physical objects or elements in the application based on the received user's input.

12. The system according to claim 8, the processor is further configured to:
provide a plurality of mapping suggestions based on user feedback underpinned by a predefined ranking algorithm;
receive user confirmation on confirmed mappings based on the plurality of mapping suggestions; and
utilize the confirmed mappings to enrich metadata of the application.

13. The system according to claim 12, the processor is further configured to:
implement a crawling feature that, upon receiving user confirmation on the plurality of mapping suggestions, crawls through the database searching for attribute, and wherein, when the attribute exists elsewhere in the application, the processor is further configured to automatically prompt the user to confirm the mappings for each instance of the attribute.

14. A non-transitory computer readable medium configured to store instructions for implementing an automatic mapping module, wherein, when executed, the instructions cause a processor to perform the following:
converting physical object names associated with raw physical data model of an application received from a database into English terms based on a taxonomy expansion list;
applying a plurality of standardization and contextualization rules to the English terms generated from converting the physical object names;

outputting names based on applying the plurality of standardization and contextualization rules to the English terms;

applying fuzzy logic and machine learning routines and matching algorithms for matching the names to predefined logical terms to identify potential data exposures and matching columns within tables of a schema to the predefined logical terms;

automatically generating a mapping of physical objects or elements in the application with logical attributes and related business terms, wherein the applying fuzzy logic and machine learning routines and matching algorithms further comprising:

implementing a fuzzy matching rule engine configured to utilize text length or tokenization algorithms to identify a best match against the predefined logical terms; and assigning a probability of accuracy value to each matched term;

implementing an automated voting process engine, that implements a weight-based voting process, configured to select an algorithm with a maximum hit value as the best match; and populating a data catalog with the matched terms when the assigned probability of accuracy value satisfies a predetermined threshold value.

15. The non-transitory computer readable storage medium according to claim 14, wherein the instructions, when executed, cause the processor to further perform the following:

implementing a pre-processing rule engine configured to move a sub-string of each English term from a beginning to an end;

implementing a word translation rule engine configured to replace a flag with an indicator or to replace a person text to an individual;

implementing a physical object/table contextualization engine configured to combine a generic name for a column or an attribute to a table name; and implementing a post-processing rule engine configured to remove any duplicates in a column or an attribute name.

16. The non-transitory computer readable storage medium according to claim 14, wherein the taxonomy expansion list is aggregated across a plurality of line of businesses (LOBs).

17. The non-transitory computer readable storage medium according to claim 14, wherein the instructions, when executed, cause the processor to further perform the following:

receiving a user's input to confirm or reject the mapping of physical objects or elements in the application; and automatically updating the mapping of physical objects or elements in the application based on the received user's input.

18. The non-transitory computer readable storage medium according to claim 14, wherein the instructions, when executed, cause the processor to further perform the following:

providing a plurality of mapping suggestions based on user feedback underpinned by a predefined ranking algorithm;

receiving user confirmation on confirmed mappings based on the plurality of mapping suggestions; and utilizing the confirmed mappings to enrich metadata of the application.

19. The non-transitory computer readable storage medium according to claim 18, wherein the instructions, when executed, cause the processor to further perform the following:

implementing a crawling feature that, upon receiving user confirmation on the plurality of mapping suggestions, crawls through the database searching for attribute.

20. The non-transitory computer readable storage medium according to claim 19, wherein, when the attribute exits elsewhere in the application, the instructions, when executed, cause the processor to further perform the following:

automatically prompting the user to confirm the mappings for each instance of the attribute.

* * * * *